A. G. KOEPPE.
LOCK VALVE.
APPLICATION FILED MAR. 19, 1917.
1,240,734.
Patented Sept. 18, 1917.
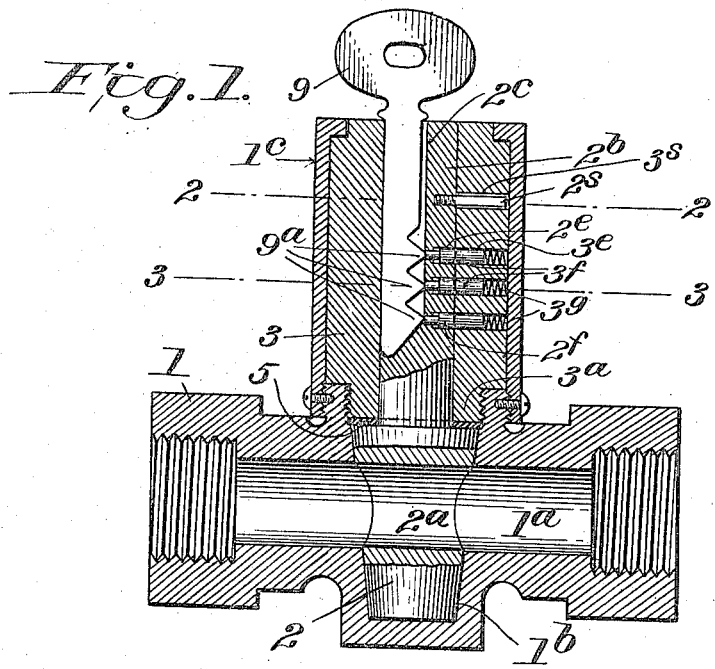
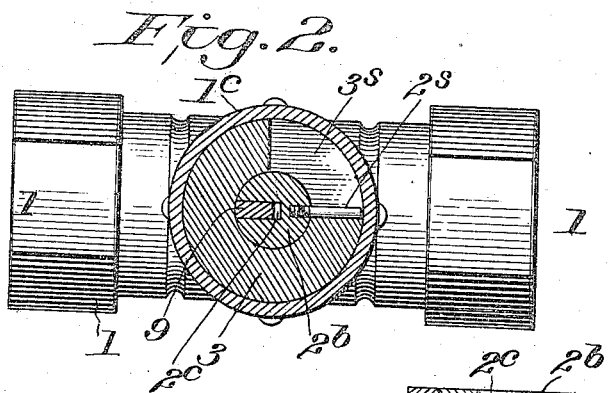
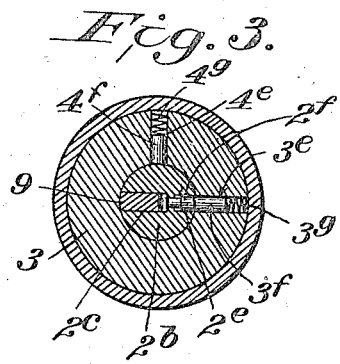
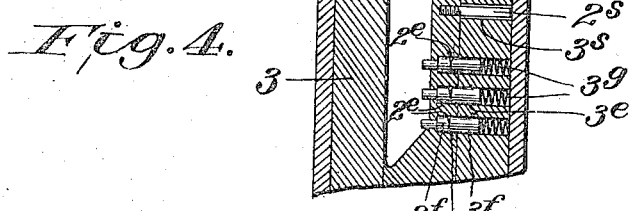
Inventor
Adolph G. Koeppe
By Alexander Lowell
Attorneys

UNITED STATES PATENT OFFICE.

ADOLPH G. KOEPPE, OF PALMYRA, ILLINOIS.

LOCK-VALVE.

1,240,734.      Specification of Letters Patent.      Patented Sept. 18, 1917.

Application filed March 19, 1917. Serial No. 155,870.

*To all whom it may concern:*

Be it known that I, ADOLPH G. KOEPPE, a citizen of the United States, residing at Palmyra, in the county of Macoupin and State of Illinois, have invented certain new and useful Improvements in Lock-Valves; and I hereby declare that the following is a full, clear, and exact description thereof, reference being had to the accompanying drawings, which form part of this specification.

This invention is a novel improvement in valves or stop cocks useful for various purposes, and which it is desired to have locked in either closed or open position. The object of the present invention is to provide a novel self-contained self locking valve; which is locked preferably in both its closed and open positions but which can be unlocked by the insertion of a proper key, which key may also serve as a means for turning the stem, the valve being unlocked in either closed or open positions when the key is inserted, and being locked in either position when the key is removed.

I will explain the invention with reference to the accompanying drawings which illustrate one practical embodiment thereof and refer to the claims for summaries of the essential features and combinations of parts for which protection is desired.

In said drawings:

Figure 1 is a vertical sectional elevation of the complete valve.

Fig. 2 is a horizontal section on the line 2—2 Fig. 1.

Fig. 3 is a horizontal section on the line 3—3 Fig. 1.

Fig. 4 is a detail section like the upper part of Fig. 1, showing how the valve stem is locked when the key is removed.

The valve shown is a simple one way valve, and has a main casing 1 having a straight passage $1^a$ for the fluid, the casing being suitably internally threaded at the ends of this passage for connection with pipes in the usual manner. The casing also has a transverse bore $1^b$ which intersects the water-way, and which is preferably tapered for the reception of a valve member 2 which has a passage $2^a$ adapted in one position of the valve member to register with the passage $1^a$ to permit flow of fluid through the valve; but if the valve member is given a quarter turn the passage $2^a$ will be moved entirely out of register with the opening 1 and the valve will be closed.

The valve member 2 has a stem $2^b$ which extends into the T $1^c$ of the casing, which T may form part of or be rigidly secured to the casing 1 in any convenient manner.

The stem $2^b$ enters a bushing 3 which is fitted within the T $1^c$ and has a reduced threaded inner end $3^a$ engaging the correspondingly internally threaded upper end of the bore $1^b$ as shown in the drawings. The bushing 3 practically fills the T $1^c$, but has a central bore to accommodate the stem $2^b$ of the valve-member.

The valve stem $2^b$ has a vertical key slot $2^c$ for the insertion of a master key 9 as indicated in Fig. 1. And communicating with the key slot $2^c$ in the stem are, preferably, a plurality of radially disposed slots $2^e$ in which are tumbler members $2^f$. Preferably at least three tumblers $2^f$ are provided as shown, this number however may be varied. These tumbler members are adapted to project into the key slot $2^c$ as indicated in Fig. 4 when the key is withdrawn, being thus projected into the key slot by the action of locking tumblers $3^f$ or $4^f$ hereinafter referred to.

The bushing 3 is also provided with a set of radial bores $3^e$; preferably corresponding in number and position with the bores $2^e$ in the stem $2^b$, and adapted to register with the slots $2^e$ when the valve is closed. Within each of the bores $3^e$ is a tumbler $3^f$ which is projected inwardly by suitable means such as a spring $3^g$ interposed between the tumbler and the wall of the T $1^c$, or the outer end of the bore, so that the tumblers $3^f$ are normally pressed inward toward the stem, and when the stem is turned so that the bores $2^e$ register with the bores $3^e$ the springs $3^g$ project the tumblers $3^f$ inward into the bores $2^e$ as indicated in Fig. 2 and move the tumblers $2^f$ inward so that they partially project into the key slot $2^c$ as indicated in Fig. 4 and in such position the tumblers $3^f$ will lock the stem $2^f$ and the valve member against rotative movement. The tumblers $3^f$ are arranged at such a point that they will lock the valve in open position.

The bushing 3 is, preferably, provided with another set of radially disposed bores 4ᵉ corresponding to the bores 3ᵉ but removed about 45 degrees therefrom. In these bores 4ᵉ are plungers 4ᶠ, corresponding to the plungers 3ᶠ, and springs 4ᵍ, corresponding to springs 3ᵍ, so that when the valve-member is turned to "closed" position and the key removed the valve-member will be locked in closed position by the tumblers 4ᶠ.

The key 9 is preferably provided with projections 9ᵃ which when the key is properly inserted in the slot 2ᶜ will respectively engage the inner ends of the tumblers 2ᶠ and force them radially outward together with the opposed tumblers 3ᶠ, (or 4ᶠ) as indicated in Figs. 1 and 3 operatively disengaging the tumblers 3ᶠ or 4ᶠ from the stem 2ᵇ so that said stem can be turned, while the key is in position therein, from locked to open position, or vice versa; but when the stem is properly turned and the key withdrawn the stem will be locked in either closed or open position according to its position at the time the key was withdrawn.

Suitable stops may be provided to limit the rotative movement of the stem and valve 2 and to insure that when it has made the proper movement the tumblers 2ᶠ will be in register either with the tumblers 3ᶠ or 4ᶠ, according to the position of the valve. Any suitable stop may be employed. For convenience I have shown the stem 2ᵇ as provided with a stop pin 2ˢ which projects into a slot 3ˢ in the bushing 3, this slot extending a radius of 45 degrees so that when the stem is turned until the pin 2ˢ engages one end of the slot the valve will be arrested in open position, and when the stem is turned until the pin engages the other end of the slot the valve will be arrested in closed position.

It will be understood from the foregoing description and drawings that the valve is locked in either and both open and closed positions if the key is removed. It will be unlocked when the proper key is inserted in the stem and such key may be used to turn the valve. The number of locking tumblers employed may be varied to suit the wishes of the manufacturer so that each lock may require its own peculiar key if desired. Further it is obvious that various changes may be made in form and embodiment of the several elemental parts of the invention while retaining the essential features thereof.

A packing 5 or gasket is preferably placed around the stem between the upper end of the valve and the inner end of the bushing 3 as indicated in Fig. 1 to prevent leakage of fluid.

I claim:

1. In a lock valve, the combination of a body having a longitudinal passage, a transverse bore and an annular flange surrounding the outer end of said bore, said flange being threaded both internally and externally; a bushing having a reduced threaded en dengaging the interior threads of said flange and an axial passage alined with the bore, and a series of radially disposed openings; tumblers in said bushing openings; springs adapted to move said tumblers inwardly; and a casing fitted to and inclosing the bushing and having its lower end fastened to the exterior threaded portion of said body flange; with a rotatable valve in said bore provided with an integral axial stem fitted in the passage in said bushing, said stem having a vertical key slot and a plurality of radial openings communicating therewith adapted to register with the openings in the bushing; and tumblers in said stem openings adapted to be engaged and projected by a key inserted in the slot, substantially as described.

2. In a lock valve, the combination of a body having a longitudinal passage, a transverse bore, and an annular flange surrounding the outer end of said bore, said flange being threaded both internally and externally; a bushing having a reduced threaded end engaging the interior threads of said flange, and an axial passage alined with the bore and a radial transverse slot extending through one quarter of its circumference, and a series of radially disposed openings; tumblers in said openings; springs adapted to move said tumblers inwardly; and a casing fitted to and inclosing the bushing and having its lower end fastened to the exterior threaded portion of said body flange; with a rotatable valve located within said bore and provided with an integral axial stem fitted in the passage in said bushing, said stem having a vertical key slot and a plurality of radial openings communicating therewith adapted to the register with the openings in the bushing; tumblers in said stem openings adapted to be engaged and projected by a key inserted in the slot, and a pin on said valve stem engaging the slot in the bushing to limit the rotatorial movement of said stem.

In testimony that I claim the foregoing as my own, I affix my signature.

ADOLPH G. KOEPPE.

Copies of this patent may be obtained for five cents each, by addressing the "Commissioner of Patents, Washington, D. C."